(12) United States Patent  
Vishlitzky

(10) Patent No.: US 6,185,521 B1
(45) Date of Patent: Feb. 6, 2001

(54) SYSTEM AND METHOD FOR EMULATING MAINFRAME CHANNEL PROGRAMS BY OPEN SYSTEMS COMPUTER SYSTEMS

(75) Inventor: Natan Vishlitzky, Brookline, MA (US)

(73) Assignee: EMC Corporation, Hopkinton, MA (US)

(*) Notice: Under 35 U.S.C. 154(b), the term of this patent shall be extended for 0 days.

(21) Appl. No.: 08/979,338

(22) Filed: Nov. 24, 1997

Related U.S. Application Data

(62) Division of application No. 08/602,614, filed on Feb. 16, 1996.

(51) Int. Cl.[7] .................................................. G06F 9/455
(52) U.S. Cl. .............................. 703/26; 703/24; 703/27; 710/5; 711/4
(58) Field of Search ...................... 711/4; 710/5; 714/25; 395/500.44, 500.45, 500.46, 500.48; 703/23, 24, 25, 26, 27

(56) References Cited

U.S. PATENT DOCUMENTS

| | | | |
|---|---|---|---|
| 4,527,237 | 7/1985 | Freider et al. ........................ | 364/200 |
| 4,709,328 | 11/1987 | Anthony, Jr. et al. ............... | 364/200 |
| 4,722,048 | 1/1988 | Hirsch et al. ........................ | 364/200 |
| 5,428,801 | 6/1995 | Murano et al. ...................... | 395/500 |
| 5,463,754 | 10/1995 | Beausoleil et al. ............. | 395/200.08 |
| 5,515,525 | 5/1996 | Grynberg et al. ................... | 395/500 |
| 5,524,218 | * 6/1996 | Byers et al. ........................ | 395/309 |
| 5,530,844 | 6/1996 | Phillips et al. ...................... | 395/500 |
| 5,530,845 | * 6/1996 | Hiatt et al. .......................... | 395/500 |
| 5,564,019 | 10/1996 | Beausoleil et al. ............. | 395/200.08 |
| 5,572,711 | 11/1996 | Hirsh et al. ......................... | 395/500 |
| 5,590,311 | 12/1996 | Matsushima ........................ | 395/500 |
| 5,615,335 | 3/1997 | Onffroy et al. ................. | 395/183.06 |
| 5,619,650 | * 4/1997 | Bach et al. ...................... | 395/200.01 |
| 5,630,164 | 5/1997 | Williams et al. .................... | 395/800 |
| 5,636,359 | 6/1997 | Beardsley et al. .................. | 395/449 |
| 5,649,185 | * 7/1997 | Antognini et al. ................... | 395/609 |
| 5,664,219 | * 9/1997 | Glassen et al. ..................... | 395/825 |
| 5,717,951 | 2/1998 | Yabumoto ........................... | 395/831 |
| 5,758,125 | 5/1998 | Misinai et al. ...................... | 395/500 |
| 5,819,054 | 10/1998 | Ninomiya et al. .................. | 395/308 |

* cited by examiner

*Primary Examiner*—Kevin J. Teska
*Assistant Examiner*—Samuel Broda
(74) *Attorney, Agent, or Firm*—Leanne J. Fitzgerald; John M. Gunther

(57) ABSTRACT

A digital computer system comprises a mass storage subsystem and an "open systems" computer system. The mass storage subsystem includes a storage device for storing data and an access control for performing an access operation in connection with the storage device in response to a channel program received thereby in at least one channel program information transfer packet. The channel program includes at least one channel command and the supplementary channel command processing information useful in processing the at least one channel command. The "open systems" computer system performs processing operations in response to programs. During at least one the processing operation, the "open systems" computer system generates a channel program, including at least one the channel command and the supplementary channel command processing information useful in processing the at least one channel command, and transfers the channel program in the at least one channel program information transfer packet to the mass storage subsystem to initiate an access operation.

13 Claims, 8 Drawing Sheets

SYSTEM AND METHOD FOR EMULATING MAINFRAME CHANNEL PROGRAMS BY OPEN SYSTEMS COMPUTER SYSTEMS

This application is a division of application Ser. No. 08/602,614, filed on Feb. 16, 1996, which is currently pending.

FIELD OF THE INVENTION

The invention relates generally to the field of digital computer systems and more particularly to systems and methods for allowing emulation of mainframe channel programs by "open systems" computer systems.

BACKGROUND OF THE INVENTION

"Enterprise" computing systems, that is, computer systems for use in large-scale computing environments such as offices and research laboratories in which rapid processing and manipulation of large amounts of data is required, in the past have been built around large and expensive mainframe computers. Because of their expense, mainframe computers have typically been shared among a number of users, and with the processing power being allocated to particular users based on a number of criteria. However, as the computing power of personal computers, workstations, and the like has increased, they have become more widely used in enterprise computer systems. Unlike mainframe computers, personal computers, workstations and the like are relatively inexpensive devices which are distributed among workers in the enterprise. One advantage that mainframe computers have over personal computers and workstations, however, is that they (the mainframe computers) more easily provide for sharing of the same data and programs, which can be important in an enterprise environment. To facilitate program and data sharing among personal computers and workstations, networks have been developed over which one personal computer or workstation can make use of data and programs on another "remote" device, in general by causing the data and programs to be "downloaded," that is, transferred to it for processing. In addition, a personal computer or workstation can, typically over a communications medium such as the public telephony system, engage in a communications session with another remote device in which it effectively operates as a terminal on the remote device, enabling the remote device to process programs using data input that it provides.

Typically, when personal computers and workstations are introduced in an enterprise environment, either in addition to or as a replacement for a mainframe computer, it is desired that they (the personal computers and workstations) be able to perform at least some processing operations which are similar to those that were or are being performed by the mainframe computer system. Since programs for controlling these operations have already been prepared for the mainframe computer systems, and have been verified and enhanced over long periods of usage, it would be preferable to merely re-compile the programs for processing by the personal computers and workstations. A problem arises, however, since the architectures of mass storage subsystems which are used with mainframe computer systems, and the mechanism by which data is obtained from and stored in such subsystems, typically differs significantly from those that are used in connection with personal computers and workstations. This problem may be addressed by, for example, reformatting and re-structuring the data that is stored in the mass storage subsystems according to the storage architectures of the personal computers and workstations, but this may require significant changes to the programs during the re-compilation process, which can introduce errors in the programs. In addition, if the data is re-formatted and restructured to accommodate the needs of personal computers and workstations, that may preclude or complicate sharing of the data with the mainframe computers which may also be present in the system.

SUMMARY OF THE INVENTION

The invention provides a new and improved system and method for facilitating emulation of a mainframe channel program by an "open systems" computer system.

In brief summary, the invention in one aspect provides a digital computer system comprising a mass storage subsystem and an "open systems" computer system. The mass storage subsystem includes a storage device for storing data and an access control for performing an access operation in connection with the storage device in response to a channel program received thereby in at least one channel program information transfer packet. The channel program includes at least one channel command and the supplementary channel command processing information useful in processing the at least one channel command. The "open systems" computer system performs processing operations in response to programs. During at least one the processing operation, the "open systems" computer system generates a channel program, including at least one the channel command and the supplementary channel command processing information useful in processing the at least one channel command, and transfers the channel program in the at least one channel program information transfer packet to the mass storage subsystem to initiate an access operation.

In another aspect, the invention provides a method of operating a digital computer system comprising an "open systems" computer system mass storage subsystem and a mass storage subsystem. The mass storage subsystem includes a storage device for storing data and an access control for performing an access operation in connection with the storage device. In accordance with the method "open systems" computer system is enabled to generate a channel program, including at least one channel command and supplementary channel command processing information useful in processing the at least one channel command, and transfer the channel program in at least one channel program information transfer packet to the mass storage subsystem to initiate an access operation. The mass storage subsystem is enabled to receive the at least one channel program information transfer packet and perform a the access operation in connection with the storage device in response to the channel program received thereby in the at least one channel program information transfer packet.

In yet another aspect, the invention provides an "open systems" computer program product for use in controlling operations of an "open systems" computer system in a digital computer system. The digital computer system comprises the "open systems" computer system and a mass storage subsystem, the mass storage subsystem storing data for access during an access operation, to facilitate an access operation in connection with the mass storage subsystem. The "open systems" computer program product comprises a computer-readable medium having recorded thereon channel program generation code devices and channel program transfer code devices. The channel program generation code devices enable the "open systems" computer system to generate a channel program, the channel program comprising at least one channel command and supplementary channel command processing information useful in processing the at least one channel command. The channel program transfer code devices enable the "open systems" computer system to transfer the channel program in at least one channel program information transfer packet to the mass storage subsystem to initiate an access operation.

In yet a further aspect, the invention provides a mass storage subsystem computer program product for use in controlling operations of a mass storage subsystem in a digital computer system, the digital computer system comprising the "open systems" computer system and the mass storage subsystem, the mass storage subsystem storing data for access during an access operation, to facilitate an access operation in connection with the mass storage subsystem, the mass storage subsystem computer program product comprises a computer-readable medium having recorded thereon channel program transfer code devices and access operation control code devices. The channel program transfer code devices enable the a mass storage subsystem to receive the at least one channel program information transfer packet. The access operation control code devices enable the mass storage subsystem to perform a the access operation in connection with the storage device in response to the channel program received thereby in the at least one channel program information transfer packet.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
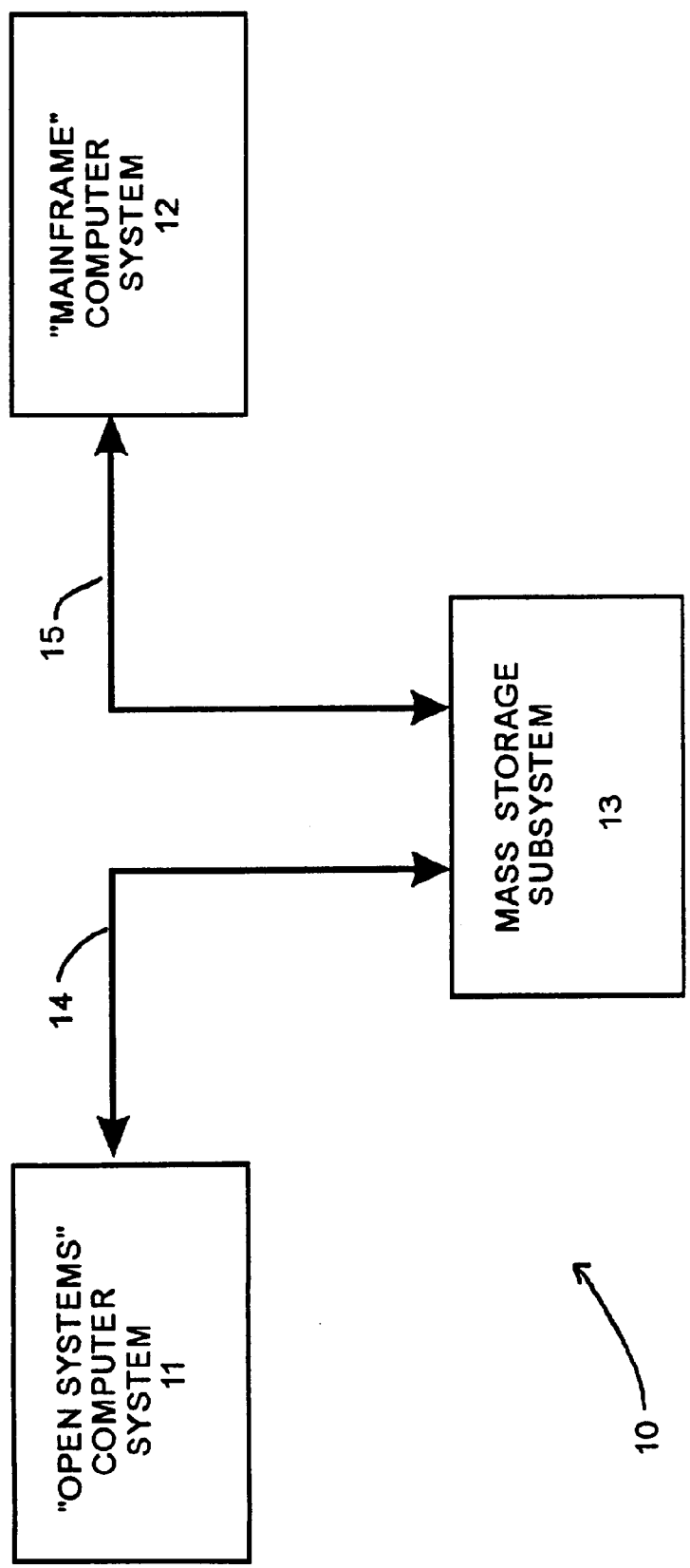
FIG. 1 is a functional block diagram of a digital computer system that is useful in understanding the invention.

FIG. 1 is a functional block diagram of a digital computer system 10 that is useful in understanding the invention. With reference to FIG. 1, the digital computer system 10 includes an "open systems" computer system 11 and a "mainframe" computer system 12, both of which may be connected to a mass storage subsystem 13 over respective buses 14 and 15.

The "open systems" computer system 11 comprises, for example, a personal computer, computer workstation or the like which processes application programs in connection with an "open" operating system such as, for example, the well-known Unix operating system, the MS-DOS and/or Windows operating systems from Microsoft Corporation or the like. The "open systems" computer system 11 in one embodiment will typically include a processor module, and operator interface elements including operator input components such as a keyboard and/or a mouse and an operator output element such as a video display device. The processor module may also include, for example, processor, memory and local mass storage devices such as disk and/or tape storage elements which perform processing and storage operations in connection with digital data provided thereto. The processor module will also include a bus interface which interfaces the "open systems" computer system 11 to bus 14, which allows the "open systems" computer system 11, inter alia, to transfer data to the mass storage subsystem 13 for storage and retrieve previously-stored data from the mass storage subsystem 13. The operator input components permit an operator to input information for processing, and the video display device display output information generated by the processor module on a screen to the operator, including data that the operator may input for processing, information that the operator may input to control processing, as well as information generated during processing. The processor module generates information for display by the video display device using, for example, a so-called "graphical user interface" ("GUI"). In one embodiment, the bus 14 is a conventional SCSI ("small computer systems interface") bus.

The "mainframe" computer system 12, on the other hand, is a computer of the type such as the various computers in the System 360, System/370 and Enterprise System/390 families those sold by International Business Machines Corporation ("IBM"), and compatible systems sold by other vendors. The mainframe computer system computer system 12 in one embodiment will also typically include a processor module including, for example, processor and memory devices, and may also include local mass storage devices. The processor module will also include a bus interface which interfaces the mainframe computer system 12 to bus 15, which allows the mainframe computer system 12, inter alia, to transfer data to the mass storage subsystem 13 for storage and retrieve previously-stored data from the mass storage subsystem 13. The mainframe computer system 12 will generally be connected to one or more operator terminals, each of which may include a respective operator input device such as a keyboard and/or a mouse, and an operator input devices such as a video display terminal. As with the "open systems" computer system 11, each operator input device connected to the mainframe computer system 12 permits an operator to input information for processing, and the video display devices display output information generated by the processor module on a screen to the operator, including data that the operator may input for processing, information that the operator may input to control processing, as well as information generated during processing. The processor module generates information for display by the video display device using, for example, a so-called "graphical user interface" ("GUI"). In that embodiment, bus 15 may comprise, for example, one of a number of channel to control unit interfaces that are described in various publications, such as a parallel interface described in "Enterprise Systems Architecture/390 System/360 and System/370 I/O Interface Channel To Control Unit Original Equipment Manufacturers' Information" (11th Edition, September 1992) (Document No. GA22-6974-10) from International Business Machines Corporation, and an interface provided by ESCON channel interface adapters sold by, for example, International Business Machines Corporation.

The mass storage subsystem 13 provides mass data storage for the "open systems" computer system 11, mainframe computer system 12 and/or other computer system(s) (not shown), which may include other "open systems" computer systems and mainframe computer systems. In one embodiment, the mass storage subsystem 13 is similar to the digital data storage subsystem described in U.S. Pat. No. 5,206,939, entitled System And Method For Disk Mapping And Data Retrieval, issued Apr. 27, 1993 to Moshe Yanai, et al., and assigned to the assignee of the present application (incorporated herein by reference). As described in that patent, the mass storage subsystem 13 stores data provided by the mainframe computer system 12 in so-called "CKD" ("count-key-data") format which is typically received from and used by a mainframe computer 12, in disk storage devices (not separately shown) which have so-called "FBA" ("fixed block architecture") format in a manner which emulates the structure of the data's CKD format.

The mass storage subsystem 13 performs a number of operations, including data storage operations to write data received from computer system 11 or 12 onto a disk storage unit, retrieval operations to read data from a disk storage unit for transfer to a computer system 11 or 12, and other operations (which will collectively be referred to as "input/output operations) under control of a channel program comprising one or more commands received from the respective computer system 11 or 12. In addition, if the input/output operation is a write operation, the respective computer system 11 or 12 will provide the data to be written.

Figure 2:
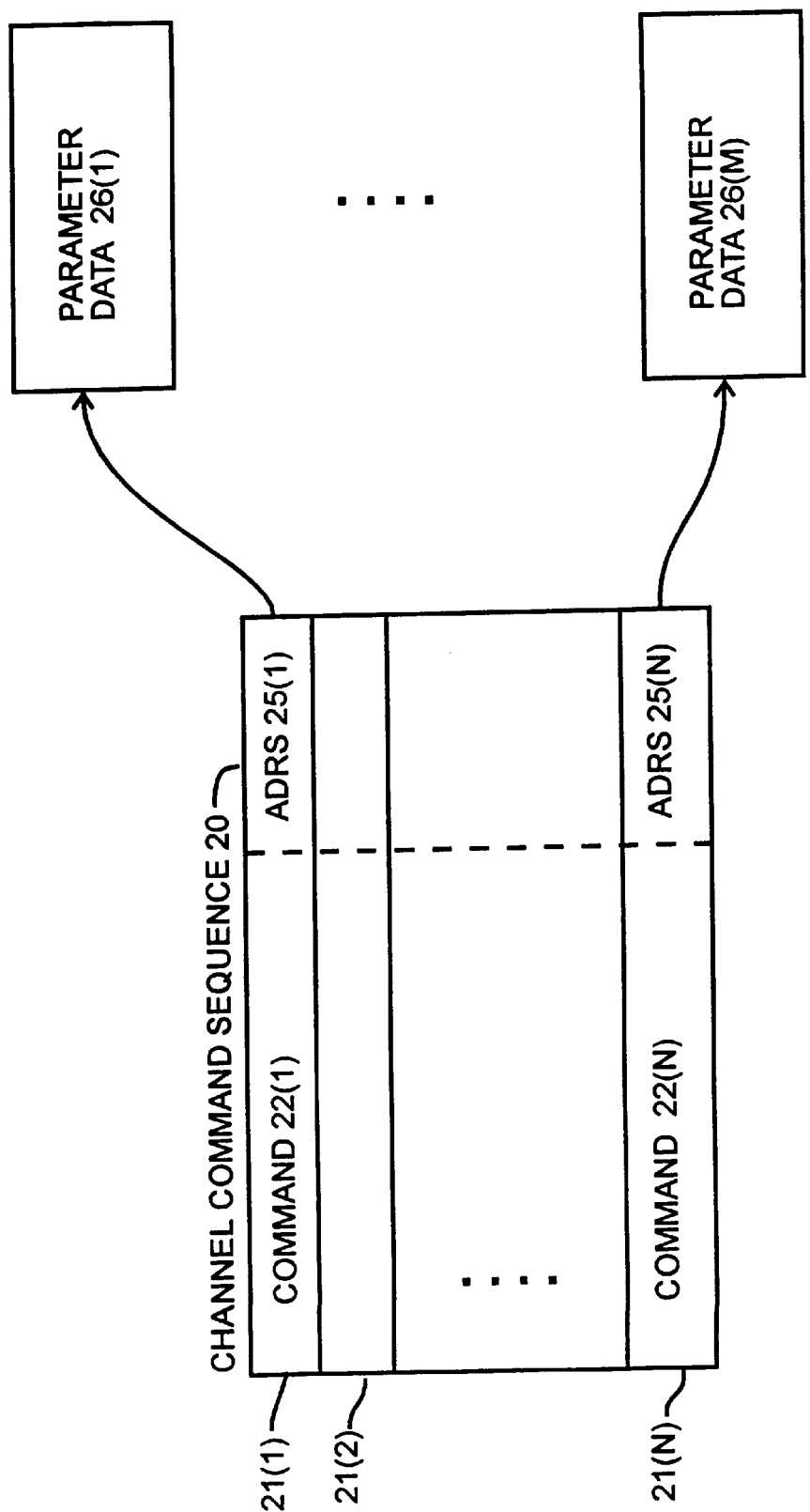
FIG. 2 is a diagram of a channel command sequence which may be issued by the mainframe computer system depicted in FIG. 1 to enable the mass storage subsystem depicted in FIG. 1 to perform an input/output operation.

Before proceeding further, it would be helpful to describe a mainframe channel program which is used by the mainframe computer system 12 to control the mass storage subsystem 13 during an input/output operation. An illustrative channel program is depicted in FIG. 2. With reference to FIG. 2, the channel program consists of a channel command sequence 20 and may also include one or more sets of parameter data 26($l$) through 26(M) (generally identified by reference numeral 26($m$)). The channel command sequence includes a series of channel command words 21($l$) through 21(N) (generally identified by reference numeral 21($n$)), each of which enables the mass storage subsystem 12 to perform a selected operation, such as seek, search, read, write, provide status information, and so forth.

Generally, the structure of the various channel command words which may be used in a channel command sequence 20 is well known in the art. The various types of channel command words which may be used in a channel program, and the currently specified structures of the various types of channel command words and the information contained therein, are described in a number of publications, including, for example, "IBM 3990 Storage Control Reference (Models 1, 2 and 3)" (7th Edition, October, 1994) (Document No. GA32-0099-06) from International Business Machines Corporation. As described in the aforementioned publication, each channel command word 21($n$) includes a command field 22($n$) and an address field 25($n$), and may also include other fields (not shown). The command field 22($n$) identifies the particular operation to be performed in response to the channel command word. A number of types of operations may be initiated, including, for example, the aforementioned seek, search, read, write, and return status information operations, as well as a number of other types of operations. The channel command word's address field 25($n$) may contain a pointer to storage locations in the mainframe computer system's memory (not separately shown), which is represented in FIG. 2 as a parameter data field 26($m$), which may contain information which may be useful to the mass storage subsystem 13 in performing an operation specified by the command in command field 22($n$), from which data may be obtained to be stored in the mass storage subsystem 13 during a write operation, or into which data from the mass storage subsystem 13 may be stored during a read operation. As shown in FIG. 2, the channel command sequence 20 is associated with "M" parameter data fields 26($l$) through 26(M) (generally identified by reference numeral 26($m$)), each of which is pointed to by a pointer in the address field 25($n$) of a channel command word 21($n$).

If a channel command word 21($n$) provides a pointer in the address field 25($n$), the parameter data field 26($m$) contains additional or supplmentary information which will be used by the mass storage subsystem 13 in executing the command identified in command field 22($n$). It will be appreciated that, if each channel command word 21($n$) in a channel program requires such additional information, the number "M" of parameter data fields 26($m$) may correspond to the number "N" of channel command words 21($n$). On the other hand, if a channel command word 21($n$) in a channel command sequence 20 does not require additional information, a parameter data field 26($m$) will typically not be provided for the channel command word, in which case the number "M" of parameter sets 26($m$) may differ from the number "N" of channel command words 21($n$).

During processing of a channel command sequence 20, when a processing channel command word 21($n$) which initiates operations by the mass storage subsystem 13, the mainframe computer system 12 will normally transmit the command from the command field 22($n$) of a channel command word 21($n$) to the mass storage subsystem 13. In addition, if the channel command word 21($n$) has an associated parameter data field 26($m$), the mainframe computer system 12 and the mass storage subsystem 13 will typically cooperate to transfer the parameter data. In the case of, for example, the transfer of contents of the parameter data field 26($m$) for a channel command word whose command is other than a read command, the mainframe computer system 12 and mass storage subsystem 13 will cooperate to transfer the contents from the mainframe computer system's memory locations identified by the channel command word's address field 25($n$) to the mass storage subsystem. On the other hand, in the case of the transfer of read data in response to a channel command word 21($n$) which contains a read command, the mainframe computer system 12 and mass storage subsystem 13 will cooperate to transfer the read data from the mass storage subsystem 13 to the mainframe computer system 12 for storage in the mainframe computer system's memory locations identified by the channel command word's address field 25($n$). In any case, after the mainframe computer system 12 provides a command from a channel command word 21($n$) of a channel command sequence 20 to the mass storage subsystem 13 for execution, the mainframe computer system 12 will typically delay providing a command from a subsequent channel command word 21(n+1) from the channel command sequence 20 to the mass storage subsystem 13 until it receives an indication from the mass storage subsystem 13 over bus 15 that it (the mass storage subsystem) has properly executed the command.

The invention provides an arrangement by which an "open systems" computer system 11 is able to send one or more channel command programs, such as a program comprising channel command sequence 20 and associated parameter data to the mass storage subsystem 13, to enable the mass storage subsystem 13 to perform the operations defined by the channel command words in the channel command sequences in the same manner as if they (the channel command sequences) were being processed by the mainframe computer system 12. This may be used, for example, in connection with processing of application programs written initially for the mainframe computer system 12, which have been recompiled for execution by the "open systems" computer system 11. Application programs written for the mainframe computer system 12 will, in connection with input/output operations, reference data in the "CKD" architecture used by the mass storage subsystem. However, the operating systems such as Unix used on "open systems" computer systems normally reference data in the "FBA" format, and converting the channel program to FBA format is difficult. In the system 10, the recompiled mainframe application program (that is, the program to be executed by the "open systems" computer system 11), to initiate an input/output operation, enables the "open systems" computer system 11 to generate a channel program generally in the same manner as it would if the recompiled application program were being executed by the mainframe computer system. However, instead of providing the channel command words of the channel program as would a mainframe computer system as described above, the "open systems" computer system 11 transmits the entire channel program, including parameters in parameter data fields 26(m), to the mass storage subsystem 13 in one or more transactions over the bus 14.

In one embodiment, in which the bus 14 is a conventional SCSI bus, the "open systems" computer system 11 makes use of several types of bus transactions, namely, a "send diagnostic" bus transaction type and a "read diagnostic results" bus transaction type for use in transferring programs to the mass storage subsystem 12 and in receiving read data and status information from the mass storage subsystem 12. During a bus transaction of either type, the "open systems" computer system 11 will transmit information, as described below in connection with FIGS. 3 through 5, which is received by the mass storage subsystem 13. Generally, the "open systems" computer system 11 uses a bus transaction of the "send diagnostics" type to transmit input/output operation command information to the mass storage subsystem 13, the input/output operation information including a channel command sequence 20. In addition, if the input/output operation defined by the channel command sequence 20 is a write operation, the "open systems" computer system 11 will also transfer the data to be written to the mass storage subsystem 13 using a bus transaction of the "send diagnostics" type.

On the other hand, if the input/output operation defined by the channel command sequence 20 is a read operation, or if the input/output operation is one in which the mass storage subsystem 13 is to transmit status information to the "open systems" computer system 11, the "open systems" computer system 11 will, after transferring the channel program in a bus transaction of the "send diagnostics" type, subsequently initiate a bus transaction of the "read diagnostic results" type to enable the mass storage subsystem 13 to transfer the respective read data or status information to the "open systems" computer system 11.

Transactions of both the "send diagnostic" type and the "read diagnostic results" type are both of variable length, that is, they may both be used to transfer variable amounts of information, with the amount of information being set forth in a transaction "header" which will be described below in connection with FIGS. 3 through 5.

More specifically, if the input/output operation is a write operation, the "open systems" computer system 11 uses a bus transaction of the "send diagnostic" type to transfer a channel program defining the input/output operation to be performed, including an entire channel command sequence 20 and the associated parameter sets 26(m) which define the write operation, to the mass storage subsystem 13 for execution. The channel command sequence 20 which the "open systems" computer system 11 transfers to the mass storage subsystem 13 to initiate the write operation will be the same sequence 20 that the mainframe computer system 12 would process if it were initiating the write operation, but instead of transmitting commands from each channel command word 21(n) to the mass storage subsystem 13 in succession, and allowing the mass storage subsystem to execute each channel command word 21(n) before transmitting the command for the next channel command word 21(n+1), the "open systems" computer system 11 will transfer all of the channel command words 21(n) in the channel command sequence 20, as well as the parameters in the parameter sets 26(m), in one or more transactions of the "send diagnostics" type.

Continuing with a write operation, after transferring the channel command sequence 20, the "open systems" computer system 11 will use a second bus transaction of the "send diagnostic" type to transfer the data that is to be stored to the mass storage subsystem 13. After receiving a channel command sequence 20 during a bus transaction of the "send diagnostic" type, the mass storage subsystem 13 will execute the channel command words 21(n) in the channel command sequence 20 in order, using the parameter information in the parameter sets 26(m), and will store the data that it receives during the second bus transaction of the "send diagnostic" type.

On the other hand, if the input/output operation is a read operation, the "open systems" computer system 11 uses a bus transaction of the "send diagnostic" type to transfer an entire channel command sequence 20, including the parameter sets 26(m), which define the read operation to the mass storage subsystem 13 for execution. The channel command sequence 20 which the "open systems" computer system 11 transfers to the mass storage subsystem 13 to initiate the read operation will be the same sequence 20 that the mainframe computer system 12 would transfer if it were initiating the read operation, but instead of transmitting the successive channel command words 21(n) to the mass storage subsystem 13 individually (allowing the mass storage subsystem to execute each channel command word 21(n) before transmitting the next channel command word 21(n+1), the "open systems" computer system 11 will transfer all of the channel command words 21(n) in the channel command sequence 20, as well as the parameters in the parameter sets 26(m), in a transaction of the "send diagnostics" type. After transferring the channel command sequence 20 to the mass storage subsystem 13 initiating a read operation, the "open systems" computer system 11 will initiate a bus transaction of the "read diagnostic results" type, during which the mass storage subsystem 13 will transmit the data to the "open systems" computer system 11.

As noted above, a channel command sequence 20 provided by the "open systems" computer system 11 may enable the mass storage subsystem 13 to provide status information regarding the status of the mass storage subsystem 13. The "open systems" computer system 11 will transfer such a channel command sequence 20, along with any necessary parameter sets 26(m), to the mass storage subsystem 13 using a bus transaction of the "send diagnostics" type. The mass storage subsystem 13 will obtain the status information and transfer it to the "open systems" computer system 11 during a subsequent bus transaction of the "read diagnostic results" type initiated by the "open systems" computer system 11.

Figure 3:
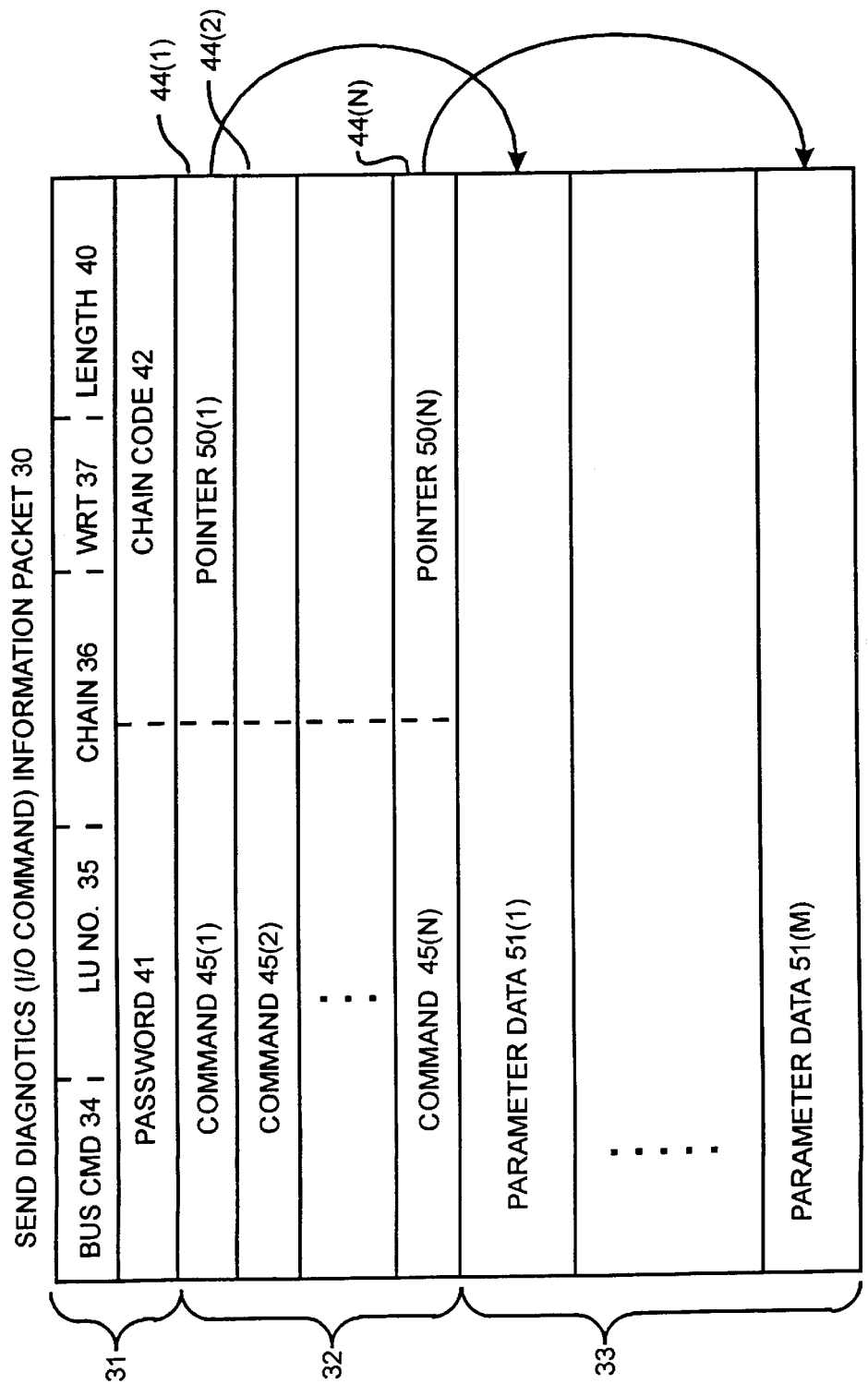
FIGS. 3 through 5 are diagrams of information packets transferred between the "open systems" computer system and mass storage subsystem depicted in FIG. 1 in connection with an input/output operation performed by the mass storage subsystem.
Figure 4:
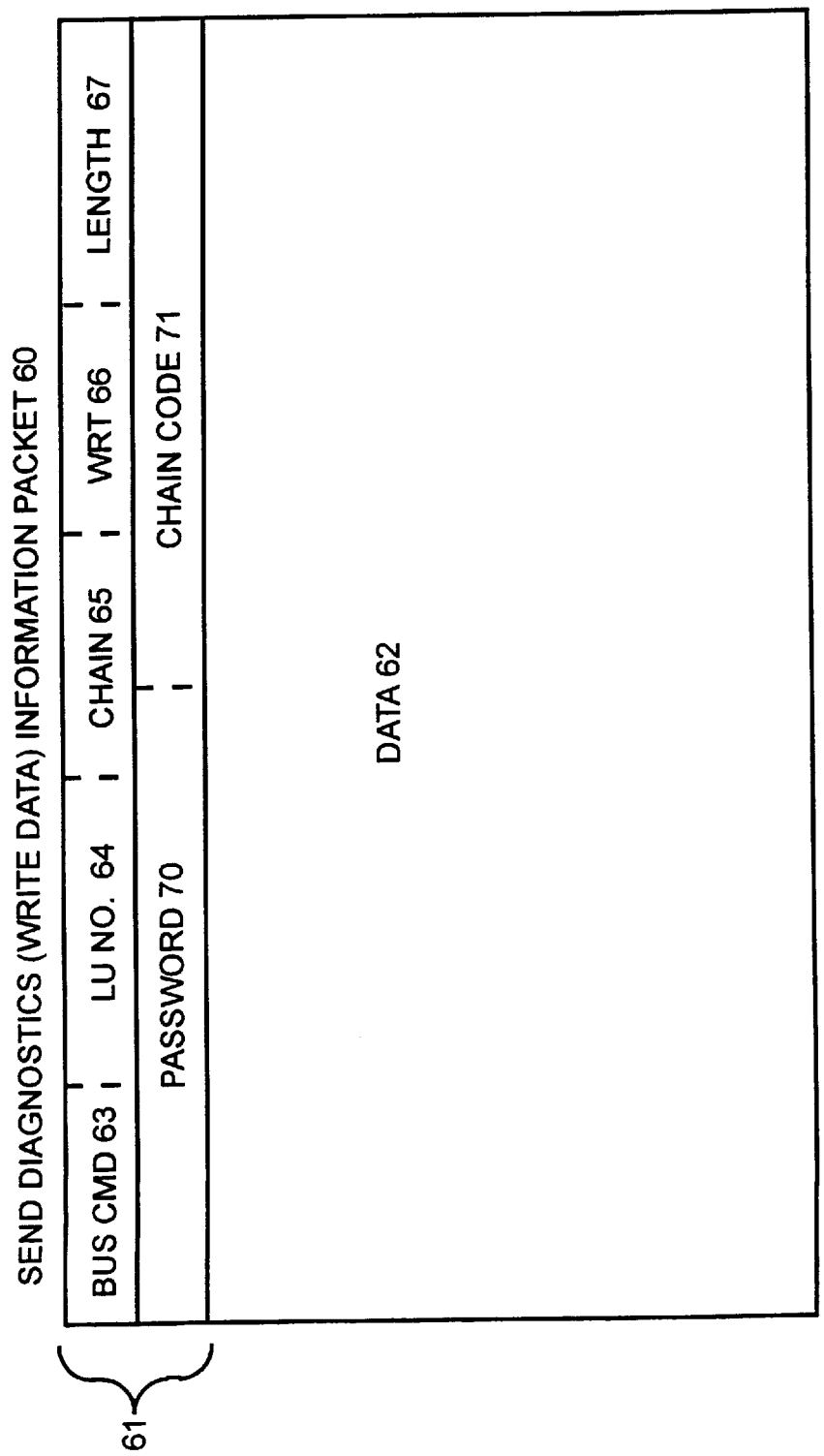
Figure 5:
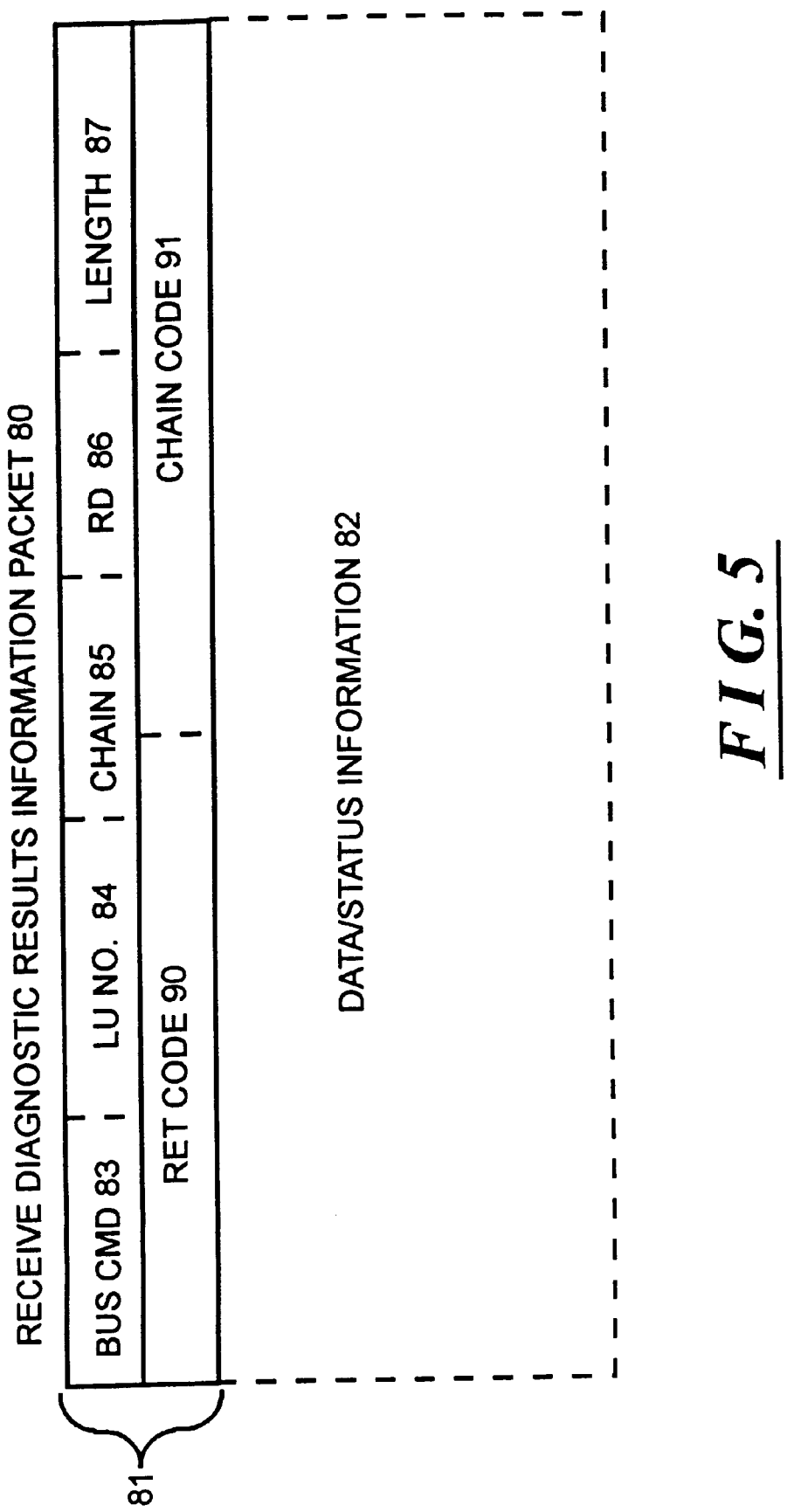

As noted above, the information transferred by the "open systems" computer system 11 to the mass storage subsystem 13 in the various types of bus transactions is depicted in FIGS. 3 through 5. Generally, FIG. 3 depicts the information transferred by the "open systems" computer system 11 in a bus transaction of the "send diagnostics" type when transferring a channel command sequence 20 (FIG. 2) to the mass storage subsystem 13. FIG. 4 depicts the information transferred by the "open systems" computer system 11 in a bus transaction of the "send diagnostics" type when transferring data to be written during a write operation. FIG. 5 depicts the information transferred by the "open systems" computer system 11 in a bus transaction of the "read diagnostics results" type to initiate a transfer of read data or status information by the mass storage subsystem.

More specifically, FIG. 3 depicts the send diagnostics (input/output command) information packet 30 defining an input/output operation which is transferred by the "open systems" computer system 11 to the mass storage subsystem 13 during a bus transaction of the "send diagnostics" type. The send diagnostics (input/output command) information packet 30 provides a channel command sequence 20 and associated parameter sets 26(*m*) (FIG. 2) to the mass storage subsystem 13. The send diagnostics (input/output command) information packet 30 includes a header section 31, a channel command word transfer section 32 and a parameter set section 33. Generally, the header section 31 contains transaction protocol information, in particular identifying the bus transaction as being of the "send diagnostics" type, identifying the unit attached to the bus 14 to receive the packet 30 (in this case the mass storage subsystem 13), and indicating the length of the packet 30. In addition, the header section 31 includes input/output operation protocol information, most notably indicating whether the input/output operation initiated by the channel command sequence transferred in the send diagnostics (input/output command) information packet 30 is part of an input/output operation sequence initiated by a plurality of channel command sequences, each of which is included in the send diagnostics (input/output command) information packet 30. If the header section 31 indicates that the input/output operation initiated by the channel command sequence is part of an input/output operation sequence, it also providing indicia identifying the particular input/output operation sequence of which it (the input/output operation) is a part.

The channel command word transfer section 32 of the send diagnostics (input/output command) information packet 30 also contains the channel command sequence 20 defining the input/output operation, and the parameter set section 33 contains the parameter values from the parameter sets 26(*m*).

More specifically, the header section 31 of the send diagnostics (input/output command) information packet 30 includes a number of fields and flags, including a bus command field 34, a logical unit field 35, a chain flag 36, a write flag 37, a length field 40, a password field 41 and a chain code field 42. The command field 34, logical unit field 35, chain flag 36, write flag 37 and length field 40 together contain protocol information used to transfer the packet 30 to its intended recipient. That is, the command field contains a value which identifies the bus transaction as a "send diagnostics" bus transaction. The logical unit number field 35 contains a value which identifies the unit connected to bus 14 to engage in the bus transaction with the "open systems" computer system 11, in this case the mass storage subsystem 13. Since during the bus transaction the "open systems" computer system 11 is transferring the send diagnostics (input/output command) information packet 30 to the mass storage subsystem 13, the write flag 37 will be set. If the send diagnostics (input/output command) information packet 30 is one of a series of packets contain information for input/output operations of the same chained input/output operation sequence, the chained flag 36 will be set. Since the send diagnostics (input/output command) information packet 30 may be of variable length, the length field 40 identifies the length of the send diagnostics (input/output command) message packet 30.

The remaining fields of header section 30, namely, the password field 41, chain flag 36, and chain code field 42 are used by the unit that receives the packet 30, in this case the mass storage subsystem 13, to control use the input/output operation control information in the packet. The password field 41 contains a password or verification control value that the mass storage subsystem 13 can use to verify that the packet contains information that it is to use. The chain code field 42 contains an input/output operation identifier value that identifies the input/output operation defined by the contents of the channel command word transfer section 32 and parameter set section 33. As will be described below in connection with FIG. 4, during a write operation, the "open systems" computer system 11 will provide the data to be written in a send diagnostics (write data) information packet 60 which includes input/output operation identifier information, which the mass storage subsystem 13 will use along with the input/output operation identifier value in field 42 (FIG. 3) to identify the input/output operation with which the write data in packet 60 is associated. In addition, as will be described below in connection with FIG. 5, during a read operation, the "open systems" computer system 11 will provide a read diagnostic results information packet 80 that also includes input/output operation identifier information, which the mass storage subsystem 13 will use along with the input/output operation identifier value in field 42 (FIG. 3) to identify the input/output operation whose read data is to be returned.

As noted above, a send diagnostics (input/output command) information packet 30 may define an input/output operation which is one of a number of operations in a chained input/output operation sequence, and in that case all of the send diagnostic (input/output command) information packets 30 will all have the same chain code value. In one embodiment, the mass storage subsystem 13 will perform the input/output operations in a chained input/output operation sequence in the order in which it receives send diagnostics (input/output command) message packets 30 which contain the same chain identifier value in their respective chain code fields 42, in which case the packets 30 for the chained input/output operation sequence need not include sequencing information.

The channel command word transfer section 32 and parameter set section 33 in send diagnostics (input/output command) information packet 30 contain the channel command word and parameter set information from the channel command sequence 20 (FIG. 2) defining the input/output operation to be performed by the mass storage subsystem 13. In particular, the channel command word transfer section 32 include a number of channel command word entries 44(*l*) through 44(N) (generally identified by reference numeral 44(*n*)), each of which contains a channel command word corresponding to the channel command words 21(*n*) in the channel command sequence 20 (FIG. 2). Each channel command word entry 44(n), in turn, includes a command field 45(n) which contains a channel command word that corresponds to the channel command word in the field 22(n) of the corresponding channel command word entry 21(n) of channel command sequence 20 for the input/output operation. The channel command word entry 44(n) also includes a pointer field 50(n) which may contain a pointer value, whose purpose will be described below.

The parameter set section 33 in send diagnostics information packet 30 contains a series of parameter data fields 51(l) through 51(M) (generally identified by reference numeral 51(m)), each of which of contains the parameter data associated with a command word from the channel command sequence 20 (FIG. 2) for the channel command words in the entries 44(n). Each pointer value which may be contained in the pointer field 50(n) of a channel command word entry 44(n) points to a parameter data field 51(m) which the mass storage subsystem 13 will use in executing the channel command word in the entry 44(n). More particularly, each pointer value in parameter offset field 50(n) of the channel command word entries 44(n) represents an offset value to the parameter data field 51(m) to be used in executing the channel command word in the channel command word entry 44(n). It will be appreciated that, as with the channel command words in entries 21(n) of channel command sequence 20, if a channel command word in a channel command word entry 44(n) does not require any parameters, no parameter data field 51(m) will be provided for the channel command word entry 44(n), and the pointer field 50(n) may contain, for example, a null value or other value indicating that no parameter data field is provided.) The pointer value in the pointer field 50(n) may be an offset from the beginning of the packet 30, from the beginning of the channel command word transfer section 32, from the channel command word entry 44(n), or from any other convenient base, and may conveniently point to the first parameter value in the entry 51(m).

It will be appreciated that, since the header 31 of the send diagnostics (input/output command) information packet 30 is of fixed size, the packet 30 does not require information such as a pointer to identify the beginning of the channel command word transfer section 32. Similarly, the send diagnostics (input/output command) information packet 30 does not require a pointer to the beginning of the parameter set section 33 (although one may be provided), since the mass storage subsystem 13 may use the value contained in, for example, the first of the first parameter offset field 51(n) which contains a non-null value (if any such field 51(n) exists in packet 30) to identify the beginning of the parameter set section 33.

As noted above, FIG. 4 depicts the information which is transferred by the "open systems" computer system 11 in a bus transaction of the "send diagnostics" type when transferring data to be written during a write operation. FIG. 4 depicts the information as a send diagnostics (write data) information packet 60, which will be transferred during such a bus transaction. With reference to FIG. 4, a send diagnostics (write data) information packet 60 includes two sections, namely, a header section 61 and a data section 62. The header section includes a number of fields and flags 63 through 67 and 70 through 71 which contain the same information as correspondingly-named fields and flags 34 through 37 and 40 through 42 in the send diagnostics (input/output command) information packet 30 (FIG. 3) described above. The data section contains the data to be written during the write operation. The chain code field 71 contains an input/output operation identifier value that corresponds to an input/output operation identifier value in a previously provided send diagnostic (input/output command) information packet(s) 30, which enables the mass storage subsystem 13 to identify the input/output operation with which the write data is associated.

The "open systems" computer system 11 can provide the data to be written for an input/output operation, or for an input/output operation sequence defined by a plurality of send diagnostic (input/output command) information packets 30 having the same input/output operation identifier value in their chain code fields 42 (FIG. 3), in a single send diagnostic (write data) information packet 60 or in a plurality of send diagnostic (write data) information packets 60 which have the same input/output operation identifier values in their chain code fields 71. If the "open systems" computer system 11 provides the write data in a plurality of send diagnostic (write data) information packets 60, in one embodiment, the mass storage subsystem 13 will use the write data for the input/output operations in a chained input/output operation sequence in the order in which it receives send diagnostics (write data) message packets 60 which contain the same chain identifier value in their respective chain code fields 71, and the packets 60 need not include sequencing information.

FIG. 5 depicts a read diagnostic results information packet 80 provided during a bus transaction of the "read diagnostics results" type to enable the mass storage subsystem 13 to transfer read data or status information to the "open systems" computer system 11. With reference to FIG. 5, the read diagnostic results information packet 80 includes a header section 81 and an information section 82. The header section 81 of information packet 80 is provided by the "open systems" computer system 11 at the beginning of the bus transaction of the "read diagnostic results" type to indicate whether read data or status information is to be transferred by the mass storage subsystem 13, and if read data is to be transferred to identify the input/output operation for which read data is to be transferred. The information section 82 is provided by the mass storage subsystem 13, and includes the read data for the input/output operation (if any) identified in the header section 81, or the status information.

Generally, the header section 81 contains transaction protocol information, in particular identifying the bus transaction as being of the "send diagnostics" type, identifying the unit attached to the bus 14 to receive the transaction (in this case the mass storage subsystem 13), and indicating the length of the transaction. In addition, the header section 81 includes input/output operation protocol information, including indicating whether the mass storage subsystem 13 is to provide read data or status and to identify the input/output operation for which read data or status is to be provided.

More specifically, the header section 81 of the read diagnostic results information packet 80 includes a number of fields and flags, including a bus command field 83, a logical unit field 84, a chain flag 85, a read flag 86, a length field 87, a return code field 90, a chain code field 91. The command field 83, logical unit field 84, chain flag 85, read flag 86 and length field 87 together contain protocol information used to transfer the packet 80 to its intended recipient. That is, the command field contains a value which identifies the bus transaction during which the read diagnostic results packet 80 is being transferred as a "read diagnostics results" bus transaction. The logical unit number field 84 contains a value which identifies the unit connected to bus 14 to engage in the bus transaction with the "open systems" computer system 11, in this case the mass storage subsystem 13. Since during the bus transaction the "open systems" computer system 11 is transferring the read diagnostic results information packet 80 to the mass storage subsystem 13, the read flag 86 will be set. If the read diagnostic results information packet 80 is one of a series of packets which will be used to enable the transfer of read data for the same chained input/output operation sequence, the chained flag 85 will be set. Since the read diagnostic results information packet 80 may be of variable length, the length field 87 identifies the length of the header section 81 of the receive diagnostic results message packet 80.

The remaining fields of header section 81, namely, the return code field 90, and chain code field 91 are used by the unit that receives the packet 80, in this case the mass storage subsystem 13, to identify the information, that is, the read data or status information, to be provided in the information section 82. The return code field 90 may indicate, for example, whether the mass storage subsystem 13 is to return read data or status information. The chain code field 91 contains a chain code identifier that identifies the input/output operation whose read data or status information is to be provided by the mass storage subsystem 13. If the return code field 90 indicates that read data is to be returned, the length field 87 may contain a null value, since the mass storage subsystem 13 will return the read data until it has returned all of the data or until the "open systems" computer system 11 terminates the bus transaction. On the other hand, if the return code field 90 indicates that status information it to be returned, the length field 87 may contain a value corresponding to the length of the status information to be returned.

Figure 6A:
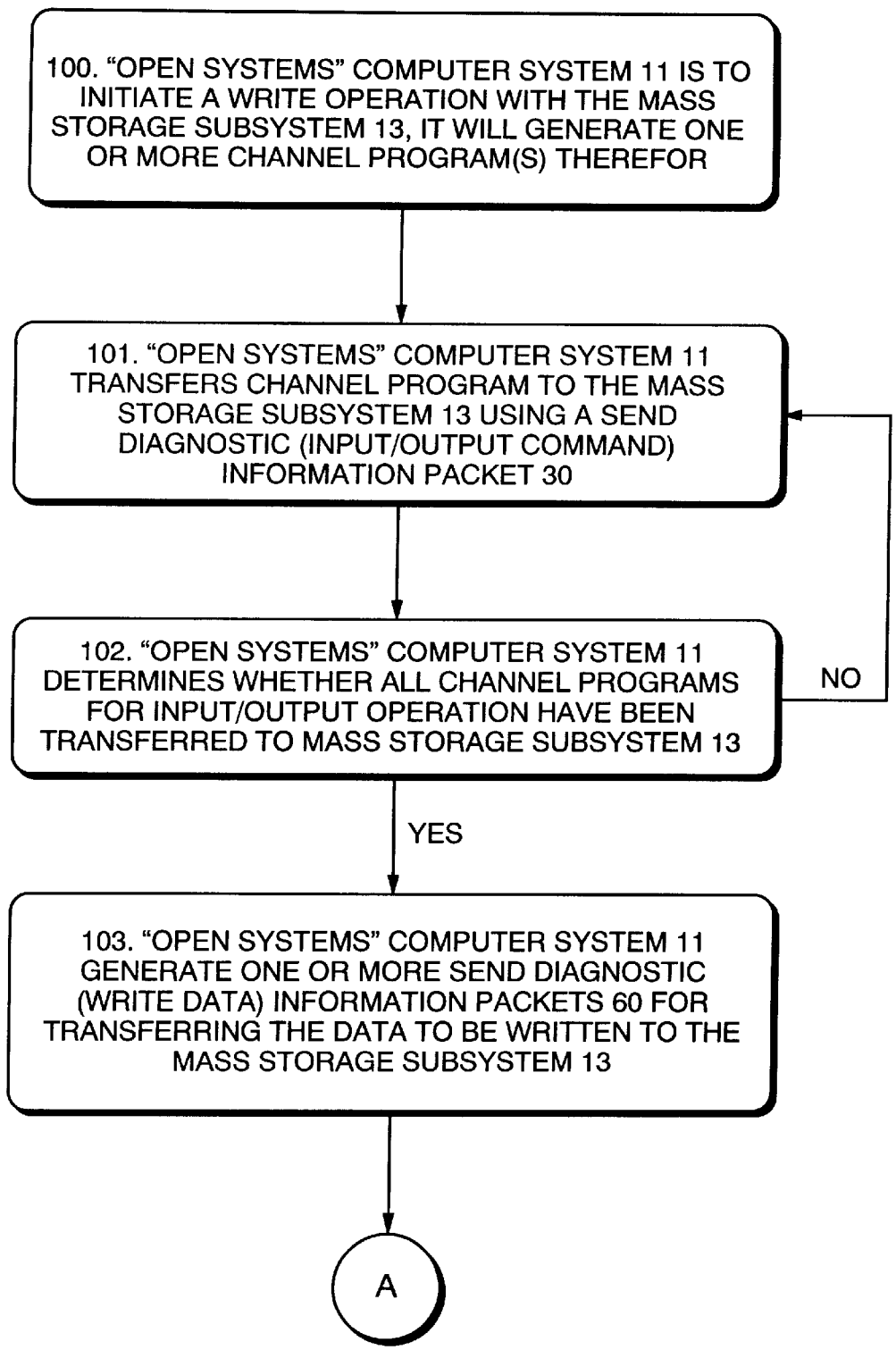
FIGS. 6A, 6B, and 7 comprise flow diagrams useful in understanding the operations performed by the "open systems" computer system and mass storage subsystem in connection with an input/output operation.
Figure 6B:
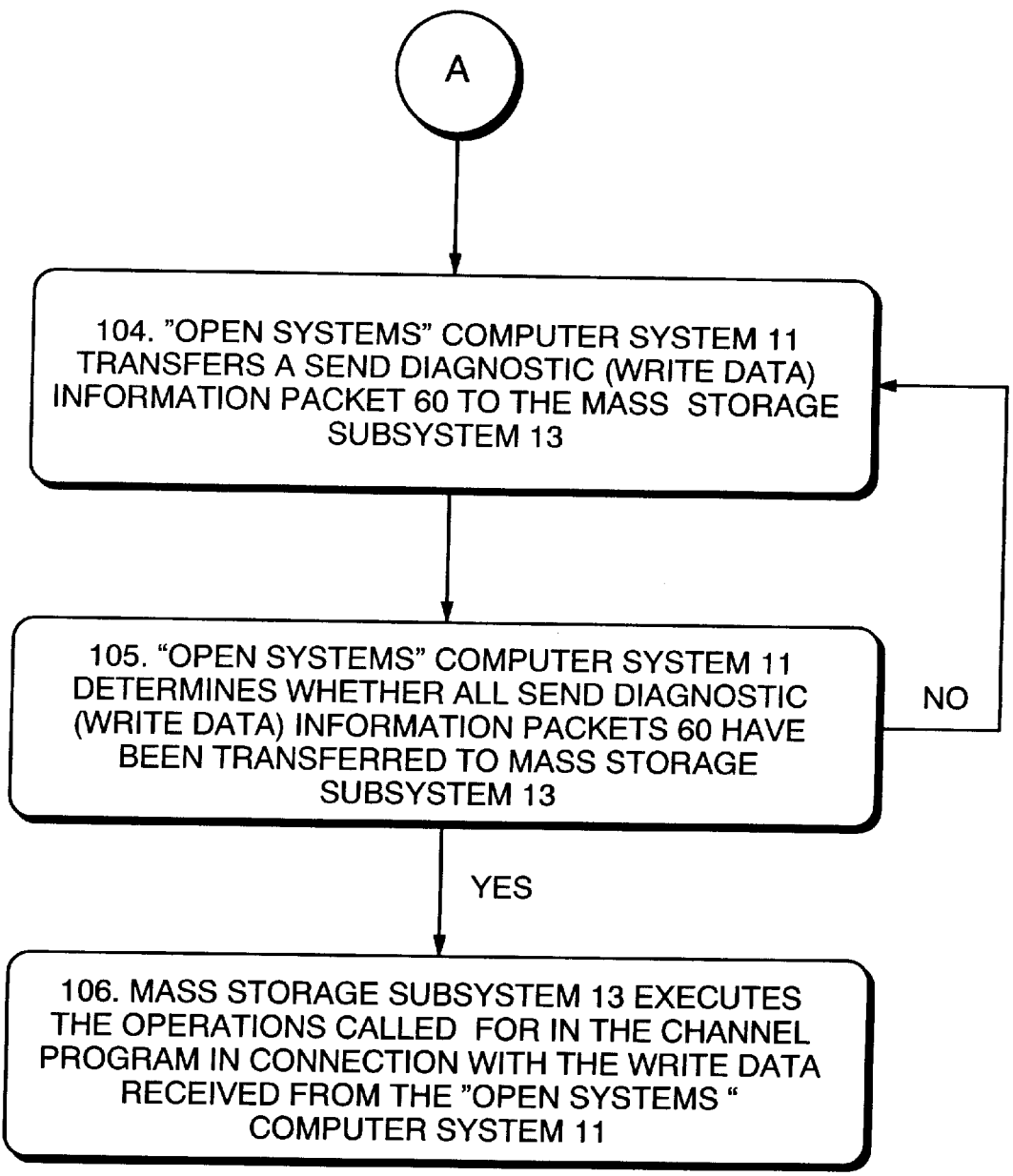
Figure 7:
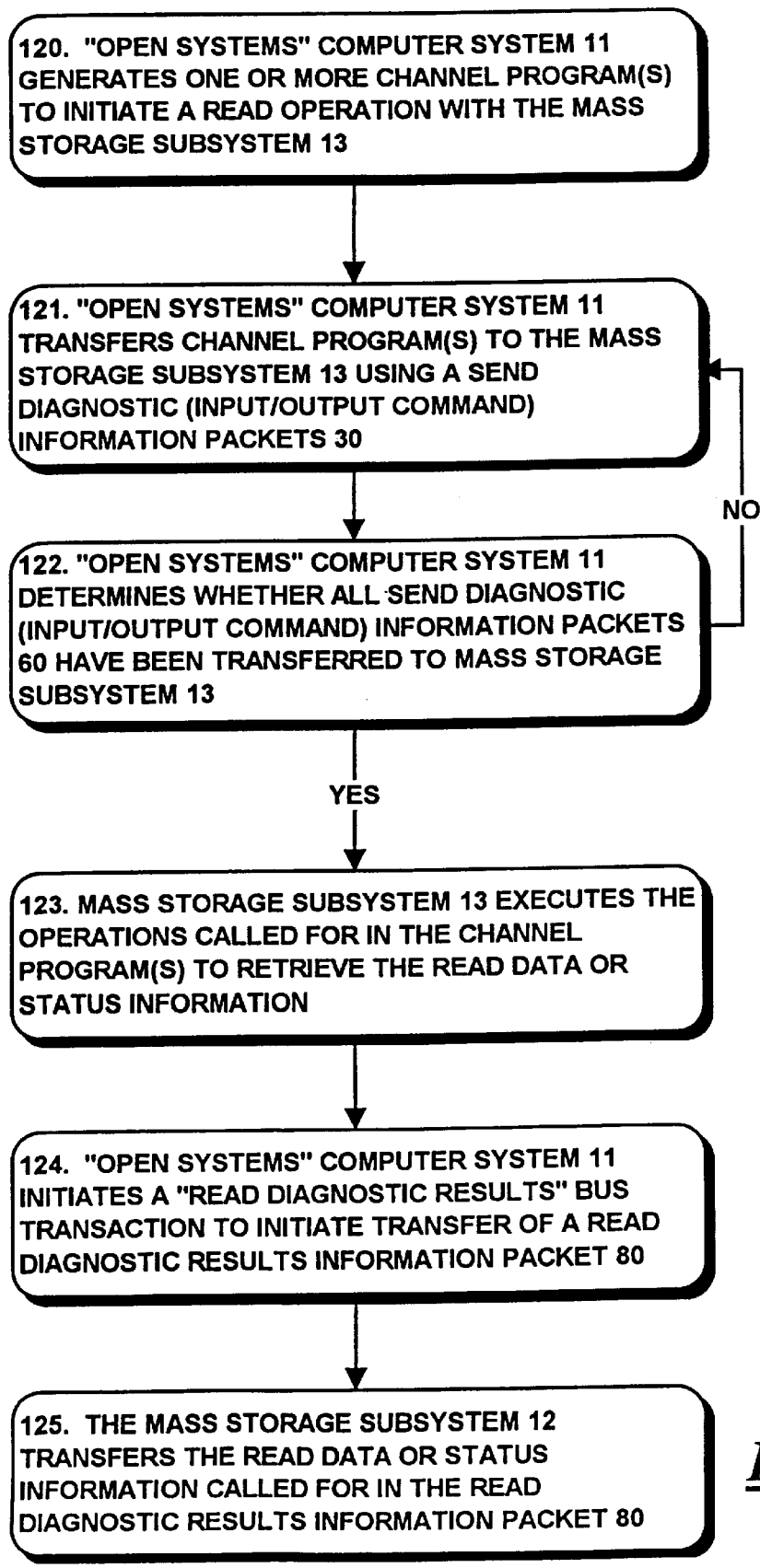

With this background, the operations performed by the "open systems" computer system 11 and mass storage subsystem 13 will be described in connection with FIGS. 6A–6B and 7. FIG. 6A–6B depict operations performed in connection with a write operation, and FIG. 7 depicts operations performed in connection with a read operation, including a read status information operation. With reference initially to FIGS. 6A–6B, when, during processing of an application program, the "open systems" computer system 11 is to initiate a write operation with the mass storage subsystem 13, it will generate one or more channel program (s) therefor (step 100) and transfer them to the mass storage subsystem 13 using one or more send diagnostic (input/output command) information packets 30 (steps 101 and 102). The operations performed by the "open systems" computer system 11 to generate the channel program are well known in the art and will not be described herein. Thereafter, the "open systems" computer system 11 will generate one or more send diagnostic (write data) information packets 60 for transferring the data to be written to the mass storage subsystem 13 (step 103) and transfer them to the mass storage subsystem 13 (steps 104 and 105). After receiving the send diagnostic (input/output command) information packet(s) 30 and the send diagnostic (write data) information packet(s) 60, the mass storage subsystem 13 executes the operations called for in the channel program in connection with the write data (step 106).

FIG. 7 depicts operations performed in connection with a read operation, including a read status information operation. With reference to FIG. 7, when, during processing of an application program the "open systems" computer system 11 is to initiate a read operation with the mass storage subsystem 13, it will generate one or more channel program(s) therefor (step 120) and transfer them to the mass storage subsystem 13 using a corresponding number of send diagnostic (input/output command) information packets 30 (steps 121 and 122). The mass storage subsystem 13 will execute the operations called for in the channel program to retrieve the read data or status information in anticipation of later receiving one or more retrieve diagnostics results information packet(s) 80 (step 123). When the "open systems" computer system 11 initiates a "read diagnostic results" bus transaction (step 124) to initiate transfer of a read diagnostic results information packet 80, the mass storage subsystem 13 returns the read data or status information called for in the read diagnostic results information packet 80 (step 125).

The system 10 constructed in accordance with the invention provides a number of advantages. For example, the invention provides an arrangement by which an "open systems" computer system 11 can process programs written for mainframe computer systems, which have been re-compiled for execution by an "open systems" computer system. The invention allows the re-compilation process to be simplified, since the same mass storage subsystem can be used for the "open systems" computer system as are used by the mainframe computer system on which the programs were initially processed, which can obviate the necessity of reformatting the data stored on the mass storage subsystem to accommodate the storage architecture of the operating system used with the "open systems" computer system 11.

In addition, if a mainframe computer system 12 is to be used along with the "open systems" computer system 11 in a system 10 as depicted in FIG. 1, the mainframe computer system 12 and "open systems" computer system 11 can readily share the same data stored on the mass storage subsystem, and access the mass storage subsystem using channel programs as described above.

It will be appreciated that numerous modifications may be made to the system 10. For example, the system 10 need not include a mainframe computer system 10, and instead the system 10 may include only an "open systems" computer system connected to mass storage subsystem 13. In addition, the system 10 may include a number of computer systems, including either or both "open systems" computer systems and mainframe computer systems, connected to mass storage subsystem 13, and the system 10 may in addition include a number of mass storage subsystems 13. In addition, although the "open systems" computer system 11 has been described as, for example, a computer system such as a personal computer, computer workstation or the like which processes application programs in connection with an "open" operating system such as Unix, MS-DOS and/or Windows operating systems, the "open systems" computer system 11 may generally include a variety of computer systems and operating systems which typically do not communicate with a mass storage subsystem in the manner described above in connection with mainframe computer system 12 to effectuate processing of a channel program.

Furthermore, while the "open systems" computer system 11 has been described as providing send diagnostic (input/output command) input/output packets 30 such that each packet 30 includes all of the information (that is, the channel command words 21(*n*) and associated parameter data fields 26(*m*) related to a channel command sequence 20) for an entire channel program, it will be appreciated that packets 30 may instead each provide a subset of the information defining the input/output operation. If a packet 30 provides a subset of the information defining an input/output operation, a series of send diagnostics (input/output command) packets 30 may be used to provide all of the information defining the channel program. In that case, all of the packets 30 in the series may have the same value in their chain code fields 42. In addition, each packet 30 may preferably include one or more channel command words and associated parameter data values.

In addition, while the "open systems" computer system 11 has, in connection with a chained write input/output operation, been described as generating and transferring all of the send diagnostic (input/output command) information packets 30 prior to generating and transferring the send diagnostic (write data) information packets 60 for the operation, it will be appreciated that the system 11 can interleave the send diagnostic (input/output command) information packets 30 and send diagnostic (write data) information packets 60. In addition, while the mass storage subsystem 13 has been described as receiving all of the send diagnostics (input/output command) information packet(s) 30 and (if the input/output operation is a write operation) the send diagnostics (write data) information packet(s) 60 relating to a chained input/output operation before it begins the input/output operation, it will be appreciated that the mass storage subsystem may schedule execution using any convenient scheduling methodology.

Furthermore, while the invention has been described in connection with a SCSI bus interconnecting the "open systems" computer system 11 and mass storage subsystem 13, and the use of bus transactions of the "send diagnostics" and "read diagnostic results" types for transferring information between the "open systems" computer system 11 and mass storage subsystem 13, it will be appreciated that numerous other types of communication links and information transfer mechanisms may be used to facilitate information transfer therebetween. By way of example, and not limitation, it will be appreciated that, if the "open systems" computer system 11 and mass storage subsystem 13 are interconnected by a bus, a variety of types of fixed- and variable-length bus transactions may be used to transfer information similar to that described above in connection with packets 30 (in particular, information similar to that described above as being transferred in fields 32 and 33, FIG. 3), 60 (in particular, information similar to that described above as being transferred in field 62, FIG. 4) and 80 (in particular, information similar to that described above as being transferred in field 82, FIG. 5) between the "open systems" computer system 11 and mass storage subsystem 13 as described above. In addition, if the "open systems" computer system 11 and mass storage subsystem 13 are interconnected by a network, a variety of types of fixed- and variable-length messages may be used to transfer similar types of information between the "open systems" computer system 11 and the mass storage subsystem 13.

In addition, although the invention has been described in connection with channel programs having structures such as depicted in FIG. 2 and illustratively described in the aforementioned "IBM 3990 Storage Control Reference (Models 1, 2 and 3)" (7th Edition, October, 1994) (Document No. GA32-0099-06), the invention may be used in connection with channel programs having a variety of diverse structures. The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Furthermore, it will be appreciated that systems constructed in accordance with the invention can be constructed in whole or in part from special purpose hardware or one or more program-controllable devices which any portion of which may be controlled by a suitable program.

What is claimed as new and desired to be secured by Letters Patent of the United States is:

1. A storage system controller comprising:
   an interface receiving commands;
   a command interpreter coupled to said interface for parsing said commands to determine if said commands are from a first command set or an ESCON channel command set embedded within a command of the first set;
   a command processor coupled to said command interpreter for processing said commands, said command processor responsive to said first set of commands for performing a first set of operations to read or write data of a first data type, said command processor further responsive to said ESCON channel commands for performing a second set of operations to read or write data of a Count Data Key (CKD) data type.

2. A storage system controller comprising:
   an interface receiving commands;
   a command interpreter coupled to said interface for parsing said commands to determine if said commands are from a first command set or a second command set;
   a command processor coupled to said command interpreter for processing said commands, said command processor responsive to said first set of commands for performing a first set of operations to read or write data of a first data type, said command processor further responsive to said second set of commands for performing a second set of operations to read or write data of a second data type
   wherein said commands of said second command set are received as data embedded in a command of said first command set and wherein said command interpreter extracts said embedded data and provides said commands from said second command set to said command processor.

3. The storage controller according to claim 2 wherein said data is Channel Command Word commands and wherein said command of a first command set is a Small Computer System Interface command.

4. The storage controller according to claim 2 wherein said data of a first data type is data stored according to a first data formatting architecture and wherein said data of a second data type is data stored according to a second different formatting architecture.

5. The storage controller according to claim 4 wherein said first data formatting architecture is a Count Key Data format and said second data formatting architecture is a Fixed Block Architecture format.

6. The storage controller according to claim 5 wherein said first set of commands is a Small Computer System Interface command set.

7. The storage controller according to claim 5 wherein said second command set is a Channel Command Word command set.

8. The storage controller of claim 7 wherein said interface receives said commands from an open systems type computer.

9. A storage system comprising:
   an interface for providing a communications channel between a host computer and said storage system;
   a controller coupled to said interface, said controller further comprising
      a command interpreter coupled to said interface for parsing said commands received from said host computer to determine if said commands are from a first command set or a second command set;

a command processor coupled to said command interpreter for processing said commands from said host computer, said command processor responsive to said first set of commands for performing a first set of operations to read and write data of a first data type, said command processor further responsive to said second set of commands for performing a second set of operations to read and write data of a second data type; wherein said commands of said second command set are received embedded in a command of said first command set and wherein said interpreter extracts said embedded commands and provides said commands from said second command set to said command processor, and a plurality of storage devices for storing said data of said first or second data type and providing said data of said first or second data type to said host computer via said controller.

10. A computer system comprising:

a storage system for storing data of a first data format and a second data format;

an open systems computer, said open systems computer enabled to transmit a first set of commands for performing a first set of operations according to a first communications protocol, said open systems computer further enabled to transmit a second set of commands for performing a second set of operations according to a second communications protocol a controller within said storage system responsive to receipt of a first command from said first set of commands, received from said open systems computer, for performing said first set of operations to write said data of a first data format and read and return said data of a first data format to the open systems computer, said controller further responsive to receipt of a second command from said first set of commands having a command from said second command set embedded therein, received from said open systems computer, for performing said second set of operations to write said data of a second data format and to read and return said data of a second data format to said open systems computer.

11. A computer system comprising:

a storage system;

a computer coupled to said storage system via a bus requiring communications occurring over said bus to adhere to a first communications protocol;

a controller within said storage system for receiving commands transmitted over said bus and for executing said commands to access data stored according to a first data format;

said computer enabled to send commands of a second communications protocol over said bus to said controller embedded within a command of a first communications protocol;

said controller responsive to receipt of said commands of a second communications protocol embedded for executing said commands of said second communications protocol in order to access data stored according to a second data format and to write data to said storage system according to said second data format.

12. The computer system of claim 11 wherein said first communications protocol requires communicating over said bus using commands defined by the Small Computer System Interface standard.

13. The computer system of claim 12 wherein said second communications protocol requires communication using commands other than said commands defined by the Small Computer System Interface standard.

* * * * *